US011714670B2

(12) United States Patent
Ito

(10) Patent No.: US 11,714,670 B2
(45) Date of Patent: Aug. 1, 2023

(54) VM PRIORITY LEVEL CONTROL SYSTEM AND VM PRIORITY LEVEL CONTROL METHOD

(71) Applicant: Nippon Telegraph and Telephone Corporation, Tokyo (JP)

(72) Inventor: Yoshito Ito, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 463 days.

(21) Appl. No.: 17/057,200

(22) PCT Filed: May 15, 2019

(86) PCT No.: PCT/JP2019/019240
§ 371 (c)(1),
(2) Date: Nov. 20, 2020

(87) PCT Pub. No.: WO2019/225419
PCT Pub. Date: Nov. 28, 2019

(65) Prior Publication Data
US 2021/0191748 A1 Jun. 24, 2021

(30) Foreign Application Priority Data
May 24, 2018 (JP) .................................. 2018-099327

(51) Int. Cl.
*G06F 9/455* (2018.01)
*G06F 9/50* (2006.01)
*H04L 41/0893* (2022.01)

(52) U.S. Cl.
CPC ........ *G06F 9/45558* (2013.01); *G06F 9/5038* (2013.01); *G06F 9/5077* (2013.01); *H04L 41/0893* (2013.01); *G06F 2009/45595* (2013.01)

(58) Field of Classification Search
CPC .................................................. G06F 9/45558
(Continued)

(56) References Cited

U.S. PATENT DOCUMENTS 8,185,894 B1 * 5/2012 Watson .................... G06F 9/485
718/1
9,477,286 B2 * 10/2016 Arndt ..................... G06F 1/3203
(Continued)

OTHER PUBLICATIONS

Access.redhat.com, [online], "Chapter 4 Configuring CPU Pinning Using a NUMA Node," 2020, retrieved on Sep. 29, 2020, retrieved from URL<https://access.redhat.com/documentation/ja-jp/red_hat_openstack_platform/9/html/instances_and_images_guide/ch-cpu_pinning>, 13 pages (with English Translation).
(Continued)

*Primary Examiner* — Mehran Kamran
(74) *Attorney, Agent, or Firm* — Fish & Richardson P.C.

(57) ABSTRACT

A physical server of a virtual machine (VM) priority control system transmits priority group setting information in which the amounts of resource usage of VMs and priority groups to which the VMs belong are stored to a controller. The controller determines a priority group to which each VM is desired to belong on the basis of an acquired amount of resource usage of the VM, generates dummy VMs corresponding to vacancies belonging to each group, and determines whether performance of each VM can be guaranteed. Further, the controller determines a new current priority group of the VM by exchanging the current priority group of the VM with the current priority group of a pair whose priory groups are paired with those of the VM among pairs of the current priority group and the desired priority group of each of the VMs and the dummy VMs.

6 Claims, 18 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 2011/0225299 | A1* | 9/2011 | Nathuji | G06F 9/5077 718/1 |
| 2013/0239111 | A1* | 9/2013 | Bingham | G06F 11/3409 718/1 |
| 2014/0047444 | A1* | 2/2014 | Yamaguchi | G06F 9/45533 718/1 |
| 2014/0068609 | A1* | 3/2014 | Breitgand | G06F 9/45533 718/1 |
| 2015/0052528 | A1* | 2/2015 | French | G06F 9/45558 718/1 |
| 2015/0178116 | A1* | 6/2015 | Jorgensen | G06F 9/455 718/1 |
| 2015/0309825 | A1* | 10/2015 | Farkas | G06F 9/5011 718/1 |
| 2016/0004554 | A1* | 1/2016 | Minezaki | G06F 11/2041 718/1 |
| 2016/0092257 | A1* | 3/2016 | Wang | H04L 41/0895 718/1 |
| 2016/0210175 | A1* | 7/2016 | Morimura | G06F 9/45533 |
| 2017/0206107 | A1* | 7/2017 | Guha | G06F 3/0647 |
| 2018/0046489 | A1* | 2/2018 | Onoue | G06F 9/5083 |
| 2019/0056877 | A1* | 2/2019 | Kolesnik | G06F 3/0631 |
| 2020/0004640 | A1* | 1/2020 | Singhal | G06F 11/1438 |
| 2020/0341852 | A1* | 10/2020 | Chopra | G06F 11/1451 |
| 2021/0004255 | A1* | 1/2021 | Ito | G06F 9/5038 |
| 2021/0216350 | A1* | 7/2021 | Ito | G06F 9/45558 |
| 2022/0229679 | A1* | 7/2022 | Mutha | G06F 9/45558 |

OTHER PUBLICATIONS

Ito, "Prototype Implementation of VNF Performance Assurance System," NTT Network Service Systems Laboratories, Jan. 18-19, 2018, 50 pages (with English Translation).

* cited by examiner

Fig. 3

| GROUP ID | PRIORITY RANK | POSSIBLE NUMBER OF VM BELONGING TO GROUP | NUMBER OF VACANCIES BELONGING TO GROUP |
|---|---|---|---|
| g0001 | 1 | 2 | 1 |
| g0002 | 2 | 4 | 0 |
| g0003 | 3 | 8 | 2 |

210 PRIORITY GROUP STATE INFORMATION
211 / 212 / 213 / 214

| VMID ~221 | STATUS ~222 | AMOUNT OF RESOURCE USAGE ~223 | PERFORMANCE VALUE ~224 | CURRENT GROUP ~225 | DESIRED GROUP ~226 | VACANCY INDICATION ~227 |
|---|---|---|---|---|---|---|
| v0001 | - | - | - | g0001 | - | 0 |
| v0002 | - | - | - | g0002 | - | 0 |
| v0003 | - | - | - | g0002 | - | 0 |
| v0004 | - | - | - | g0003 | - | 0 |
| ... | ... | ... | ... | ... | ... | ... |

220 VM STATE INFORMATION

Fig. 4

| VMID ~221 | STATUS ~222 | AMOUNT OF RESOURCE USAGE ~223 | PERFORMANCE VALUE ~224 | CURRENT GROUP ~225 | DESIRED GROUP ~226 | VACANCY INDICATION ~227 |
|---|---|---|---|---|---|---|
| v0001 | - | - | - | g0001 | - | 0 |
| v0002 | - | - | - | g0002 | - | 0 |
| v0003 | - | - | - | g0002 | - | 0 |
| v0004 | - | - | - | g0003 | - | 0 |
| ... | ... | ... | ... | ... | ... | ... |
| v0012 | - | - | - | g0001 | g0003 | 1 |
| v0013 | - | - | - | g0003 | g0003 | 1 |
| v0014 | - | - | - | g0003 | g0003 | 1 |

~220 VM STATE INFORMATION

Fig. 5

220 VM STATE INFORMATION

| VMID | STATUS | AMOUNT OF RESOURCE USAGE | PERFORMANCE VALUE | CURRENT GROUP | DESIRED GROUP | VACANCY INDICATION |
|---|---|---|---|---|---|---|
| v0001 | UNCOMPLETED | [C:80, M:20, ...] | 100 | g0001 | | 0 |
| v0002 | UNCOMPLETED | [C:60, M:20, ...] | 50 | g0002 | | 0 |
| v0003 | UNCOMPLETED | [C:40, M:20, ...] | 80 | g0002 | g0002 | 0 |
| v0004 | UNCOMPLETED | [C:20, M:20, ...] | 20 | g0003 | | 0 |
| ... | ... | ... | ... | ... | ... | ... |
| v0012 | UNCOMPLETED | — | — | g0001 | g0003 | 1 |
| v0013 | UNCOMPLETED | — | — | g0003 | g0003 | 1 |
| v0014 | UNCOMPLETED | — | — | g0003 | g0003 | 1 |

|  | g0001 | g0002 | g0003 |
|---|---|---|---|
| v0001 | 100 | 80 | 50 |
| v0002 | 80 | 50 | 30 |
| v0004 | 80 | 40 | 20 |

220 VM STATE INFORMATION

| VMID~221 | STATUS~222 | AMOUNT OF RESOURCE USAGE~223 | PERFORMANCE VALUE~224 | CURRENT GROUP~225 | DESIRED GROUP~226 | VACANCY INDICATION~227 |
|---|---|---|---|---|---|---|
| v0001 | UNCOMPLETED | [C:80, M:20, ...] | 100 | g0001 | g0002 | 0 |
| v0002 | UNCOMPLETED | [C:60, M:20, ...] | 50 | g0002 | g0001 | 0 |
| v0003 | COMPLETED | [C:40, M:20, ...] | 80 | g0002 | g0002 | 0 |
| v0004 | UNCOMPLETED | [C:20, M:20, ...] | 20 | g0003 | g0001 | 0 |
| ... | ... | ... | ... | ... | ... | ... |
| v0012 | UNCOMPLETED | — | | g0001 | g0003 | 1 |
| v0013 | UNCOMPLETED | — | | g0003 | g0003 | 1 |
| v0014 | UNCOMPLETED | — | | g0003 | g0003 | 1 |

(a)

220 VM STATE INFORMATION

| 221 VMID | 222 STATUS | 225 CURRENT GROUP | 226 DESIRED GROUP | 227 VACANCY INDICATION |
|---|---|---|---|---|
| v0001 | UNCOMPLETED | g0001 | g0002 | 0 |
| v0002 | UNCOMPLETED | g0002 | g0001 | 0 |
| v0003 | COMPLETED | g0002 | g0002 | 0 |
| v0004 | UNCOMPLETED | g0003 | g0001 | 0 |
| ... | ... | ... | ... | ... |
| v0012 | UNCOMPLETED | g0001 | g0003 | 1 |
| v0013 | UNCOMPLETED | g0003 | g0003 | 1 |
| v0014 | UNCOMPLETED | g0003 | g0003 | 1 |

(b)

| 225 CURRENT GROUP (AFTER CHANGE) |
|---|
| g0002 |
| g0001 |
| g0002 |
| g0001 |
| ... |
| g0003 |
| g0003 |
| g0003 |

Fig. 9

| VMID | STATUS | CURRENT GROUP | DESIRED GROUP | VACANCY INDICATION |
|---|---|---|---|---|
| v0001 | COMPLETED | g0002 | g0002 | 0 |
| v0002 | COMPLETED | g0001 | g0001 | 0 |
| v0003 | COMPLETED | g0002 | g0002 | 0 |
| v0004 | COMPLETED | g0001 | g0001 | 0 |
| ... | ... | ... | ... | ... |
| v0012 | COMPLETED | g0003 | g0003 | 1 |
| v0013 | COMPLETED | g0003 | g0003 | 1 |
| v0014 | COMPLETED | g0003 | g0003 | 1 |

220 VM STATE INFORMATION
221 / 222 / 225 / 226 / 227

Fig. 10

VM PRIORITY LEVEL CONTROL SYSTEM AND VM PRIORITY LEVEL CONTROL METHOD

CROSS-REFERENCE TO RELATED APPLICATIONS

This application is a National Stage application under 35 U.S.C. § 371 of International Application No. PCT/JP2019/019240, having an International Filing Date of May 15, 2019, which claims priority to Japanese Application Serial No. 2018-099327, filed on May 24, 2018. The disclosure of the prior application is considered part of the disclosure of this application, and is incorporated in its entirety into this application.

TECHNICAL FIELD

The present invention relates to a Virtual Machine (VM) priority control system and a VM priority control method for controlling the priorities of each VM such that the performance of each VM shared on a physical machine is guaranteed using a network virtualization technology.

BACKGROUND ART

In a general virtualized environment in which a plurality of VMs run on a physical server, server resources are shared by all VMs. The way of sharing is left to a hypervisor and a scheduler of a host operating system (OS) and cannot be controlled. Even in the OpenStack widely used as a virtualized environment, for example, a physical CPU (pCPU) is shared by all VMs on a physical server.

Meanwhile, a technique for fixing (pinning) a VM to a dedicated physical CPU (CPU core) has been disclosed (Non Patent Literature 1).

With this technology of the related art, it is not possible to control the degree of sharing regarding which physical CPU a plurality of VMs on a physical server are allowed to run on. Thus, resources are shared in an uncontrollable manner and the performance guarantee of VMs cannot be achieved if particular control is not performed in a virtualized environment such as OpenStack when the performance guarantee of a service is required as a network function.

In addition, efficient use of resources and use of flexible configuration which are the original merits of virtualization cannot be achieved when using the method of allocating VMs in a fixed manner such that they occupy resources.

To address such a problem, a system capable of VM performance guarantee while improving resource use efficiency (a "VM performance guarantee system 100a" illustrated in FIG. 18 which will be described below) has been proposed (see Non Patent Literature 2).

The system (VM performance guarantee system 100a) described in Non Patent Literature 2 is configured to include a physical server (compute) including a plurality of VMs and a controller. This VM performance guarantee system 100a divides physical resources into a plurality of groups and defines priority groups which can be shared by different numbers of VMs. When the controller has determined that the performance of a VM is insufficient or excessive based on the amount of resource usage of the VM, the physical server changes the priority group of the VM. This enables the performance of the VM to guarantee while physical resources of the physical server are effectively used.

CITATION LIST

Non Patent Literature

Non Patent Literature 1: "Red Hat OpenStack Platform Instance & Image Guide, Chapter 4, CPU Pinning Settings Using NUMA Nodes", [online], Red Hat, [retrieved May 1, 2018], Internet <URL: https://access.redhat.com/documentation/ja-jp/red_hat_openstack_platform/9/html/instances_and_images_guide/ch-cpu_pinning>

Non Patent Literature 2: Yoshito Ito, "Prototype Implementation of VNF Performance Guarantee System", [online], Lecture Draft Posted on Jan. 12, 2018 on 15th Network Software Workshop Website of the Institute of Electronics, Information and Communication Engineers, Internet <http://www.ieice.org/cs/ns/nws/20180118_nwspaper-.zip> (Application for exception of loss of novelty in JP 2018-044010)

SUMMARY OF THE INVENTION

Technical Problem

According to the technology described in Non Patent Literature 2, it is possible to guarantee the performance of the VM while improving the resource use efficiency. However, there is room for further improvement in the following points.

The VM performance guarantee system 100a described in Non Patent Literature 2 changes a group to which a VM belongs among priority groups in which different numbers of VMs share resources to improve resource use efficiency or to guarantee performance of the VM. Here, there needs to be a vacancy in a priority group to which the group of the VM is to be changed. On the other hand, there may be a case where there are not enough vacancies to enable such change of a VM because VMs are arranged on a physical server such that vacancies in priority groups are minimized for efficient use of resources. Therefore, even when there is no vacancy in a (candidate) priority group to which a VM is desired to newly belong when the priority group to which the VM belongs is changed, there is a need to allow the VM to belong to the group by adjusting groups to which each VM belongs while guaranteeing performance of the VM.

The present invention has been made in view of the above points and it is an object of the present invention to provide a VM priority control system and a VM priority control method that can improve resource use efficiency while more reliably guaranteeing performance of a VM even when there is no vacancy in a (candidate) priority group to which the VM is desired to belong.

Means for Solving the Problem

To solve the above problems, the invention according to first aspect provides a VM priority control system including a physical server configured to cause a plurality of Virtual Machines (VMs) to run and a controller connected to the physical server and configured to manage running states of the plurality of VMs, wherein the physical server includes: a storage unit configured to store priority group setting information including a correspondence relationship between a priority group and the plurality of VMs to be run on physical resources of the priority group, a plurality of the priority groups being a plurality of groups divided from physical resources of the physical server, each of the plurality of groups resulting from the division being configured to have an available belonging number that is different from each other, the available belonging number being the number of the plurality of VMs sharable for each of the plurality of groups, the plurality of priority groups having priorities such that a priority group of the plurality of priority groups having a smaller number of the plurality of VMs sharable has a higher priority: a resource usage amount collector configured to collect an amount of resource usage when each of the plurality of VMs runs and transmit the amount of resource usage that is collected to the controller; a priority group setting information transmitter configured to transmit the priority group setting information to the controller: and a priority group changer configured to, when priority group setting change information indicating an instruction to change the priority group of each of the plurality of VMs is received from the controller, refer to the priority group setting information and change the priority group to which a VM of the plurality of VMs belongs to a new priority group, the controller includes: a data acquirer configured to acquire the amount of resource usage of each of the plurality of VMs and the priority group setting information from the physical server; a desired group determiner configured to determine a desired priority group to which each of the plurality of VMs is desired to belong so as not to cause insufficient performance that is performance of less than a first predetermined threshold and excessive performance that is performance of a second predetermined threshold or higher by calculating a performance value of each of the plurality of VMs in a case where the VM of the plurality of VMs belongs to each priority group using the amount of resource usage of the VM of the plurality of VMs, refer to the priority group setting information to calculate the number of vacancies belonging to each priority group by subtracting the number of the plurality of VMs currently belonging to the priority group from the possible number of the plurality of VMs belonging to the priority group, generate a number of dummy VMs corresponding to the number of vacancies belonging to the priority group such that the dummy VMs belong to the priority group having the vacancies, and determine a desired priority group for the dummy VMs that are generated as a priority group with a lowest priority; a performance guarantee possibility determiner configured to determine whether performance guarantee of each of the plurality of VMs is achievable based on predetermined performance guarantee possibility determination logic using information on a current priority group to which each of the plurality of VMs currently belongs and the desired priority group, that is determined, of each of the plurality of VMs: and a priority change destination determiner configured to, when it is determined that the performance guarantee is achievable, determine a priority group as a new current priority group, the priority group being obtained by exchanging the current priority group between pairs of the current priority group and the desired priority group for each of the plurality of VMs and the dummy VMs, the pairs having a relationship in which the current priority group and the desired priority group of one of the pairs respectively match the desired priority group and the current priority group of another one of the pairs, and generate and transmit the priority group setting change information including information on the determined new current priority group to the physical server.

The invention according to fourth aspect provides a VM priority control method for a VM priority control system including a physical server configured to cause a plurality of VMs to run and a controller connected to the physical server and configured to manage running states of the plurality of VMs, wherein the physical server includes a storage unit configured to store priority group setting information including a correspondence relationship between a priority group and the plurality of VMs to be run on physical resources of the priority group, a plurality of the priority groups being a plurality of groups divided from physical resources of the physical server, each of the plurality of groups resulting from the division being configured to have an available belonging number that is different from each other, the available belonging number being the number of the plurality of VMs sharable for each of the plurality of groups, the plurality of priority groups having priorities such that a priority group of the plurality of priority groups having a smaller number of the plurality of VMs sharable has a higher priority, the VM priority control method including: by the physical server, collecting an amount of resource usage when each of the plurality of VMs runs and transmitting the amount of resource usage that is collected to the controller; by the physical server, transmitting the priority group setting information to the controller; by the controller, acquiring the amount of resource usage of each of the plurality of VMs and the priority group setting information from the physical server; by the controller, determining a desired priority group to which each of the plurality of VMs is desired to belong so as not to cause insufficient performance that is performance of less than a first predetermined threshold and excessive performance that is performance of a second predetermined threshold or higher by calculating a performance value of each of the plurality of VMs in a case where a VM of the plurality of VMs belongs to each priority group using the amount of resource usage of the VM of the plurality of VMs, referring to the priority group setting information to calculate the number of vacancies belonging to each priority group by subtracting the number of the plurality of VMs currently belonging to the priority group from the possible number of the plurality of VMs belonging to the priority group, generating a number of dummy VMs corresponding to the number of vacancies belonging to the priority group such that the dummy VMs belong to the priority group having the vacancies, and determining a desired priority group for the dummy VMs that are generated as a priority group with a lowest priority; by the controller, determining whether performance guarantee of each of the plurality of VMs is achievable based on predetermined performance guarantee possibility determination logic using information on a current priority group to which each of the plurality of VMs currently belongs and the desired priority group, that is determined, of each of the plurality of VMs: by the controller, determining, when it is determined that the performance guarantee is achievable, a priority group as a new current priority group, the priority group being obtained by exchanging the current priority group between pairs of the current priority group and the desired priority group for each of the plurality of VMs and the dummy VMs, the pairs having a relationship in which the current priority group and the desired priority group of one of the pairs respectively match the desired priority group and the current priority group of another one of the pairs, and generating and transmitting priority group setting change information including information on the determined new current priority group to the physical server; and by the physical server, referring, when the priority group setting change information is received from the controller, to the priority group setting information and changing a priority group of the VM of the plurality of VMs for which a new current priority group is indicated to the new priority group.

In this way, the VM priority control system sets a number of dummy VMs corresponding to the number of vacancies belonging to each priority group and determines desired priority groups so as not to cause insufficient performance or excessive performance. Then, when it is determined that performance can be guaranteed, the VM priority control system performs adjustment of groups to which VMs belong with those of other VMs including dummy VMs, such that current priority groups of VMs can be changed to desired priority groups. This can improve the resource use efficiency while more reliably guaranteeing the performance of the VM.

The invention according to second aspect provides the VM priority control system according to first aspect, wherein the predetermined performance guarantee possibility determination logic satisfies the following conditions 1 and 2 where the priority ranks of the priority groups are in ascending order from a highest priority:

$$\Sigma(\text{Priority rank of desired priority group}-\text{Priority rank of current priority group})\leq 0 \quad \text{(condition 1)},$$

Number of the plurality of VMs that are desired to belong to priority group with priority rank $a \leq$ Total possible number of the plurality of VMs belonging to priority groups with priority rank $a$ or higher (condition 2), where "a" indicates any of the priority ranks among all priority ranks.

In this way, with the performance guarantee possibility determination logic satisfying the conditions 1 and 2, it is possible to reliably determine that the performance of each of the plurality of VMs can be guaranteed even when the current priority group has been changed to the desired priority group.

The invention according to third aspect provides the VM priority control system according to first or second aspect, wherein the priority change destination determiner is configured to, when, among pairs of the current priority group and the desired priority group, one of the pairs has no corresponding pair, the corresponding pair having, with the one of the pairs, a relationship in which the desired priority group and the current priority group of the corresponding pair respectively match the current priority group and the desired priority group of the one of the pairs, identify a dummy VM of the dummy VMs, the dummy VM belonging to a current priority group of which priority is higher than a priority of a desired priority group of a VM of the plurality of VMs, the VM corresponding to the one of the pairs, and determine a priority group as the new current priority group, the priority group being obtained by exchanging the current priority group between the dummy VM identified and the VM, the VM corresponding to the one of the pairs.

This makes it possible to perform adjustment such that a new priority group to which a VM belongs is more reliably determined while guaranteeing the performance even when there is no pair (that have opposite pairs of priority groups to which the VMs and the dummy VMs belong and which have a matching belonging relationship when swapped) among the pairs of the current priority group and the desired priority group.

Effects of the Invention

The present invention can provide a VM priority control system and a VM priority control method that improve the resource use efficiency while more reliably guaranteeing the performance of a VM even when there is no vacancy in a priority group to which the VM is desired to belong.

BRIEF DESCRIPTION OF DRAWINGS

FIG. 3 is a diagram illustrating an exemplary data configuration of priority group state information according to the present embodiment.

FIG. 4 is a diagram illustrating an exemplary (default) data configuration of VM state information according to the present embodiment.

FIG. 5 is a diagram illustrating an exemplary data configuration of VM state information (in which dummy VMs are set) according to the present embodiment.

FIG. 6 is a diagram illustrating an exemplary data configuration of VM state information (into which the amounts of resource usage and performance values are incorporated) according to the present embodiment.

FIG. 7 is a diagram illustrating results of a demotion group search and a promotion group search performed by the desired group determiner according to the present embodiment.

FIG. 8 is a diagram illustrating an exemplary data configuration of VM state information (in which desired groups are determined) according to the present embodiment.

FIG. 9 is a diagram illustrating an exemplary data configuration of VM state information (with change destination determination (processing 1)) according to the present embodiment.

FIG. 10 is a diagram illustrating an exemplary data configuration of VM state information (with status "completed") according to the present embodiment.

DESCRIPTION OF EMBODIMENTS

A system (a VM performance guarantee system 100*a*) on which the present invention is based will be described as a comparative example before describing a mode for carrying out the present invention (hereinafter referred to as "the present embodiment").

Comparative Example

Figure 18:
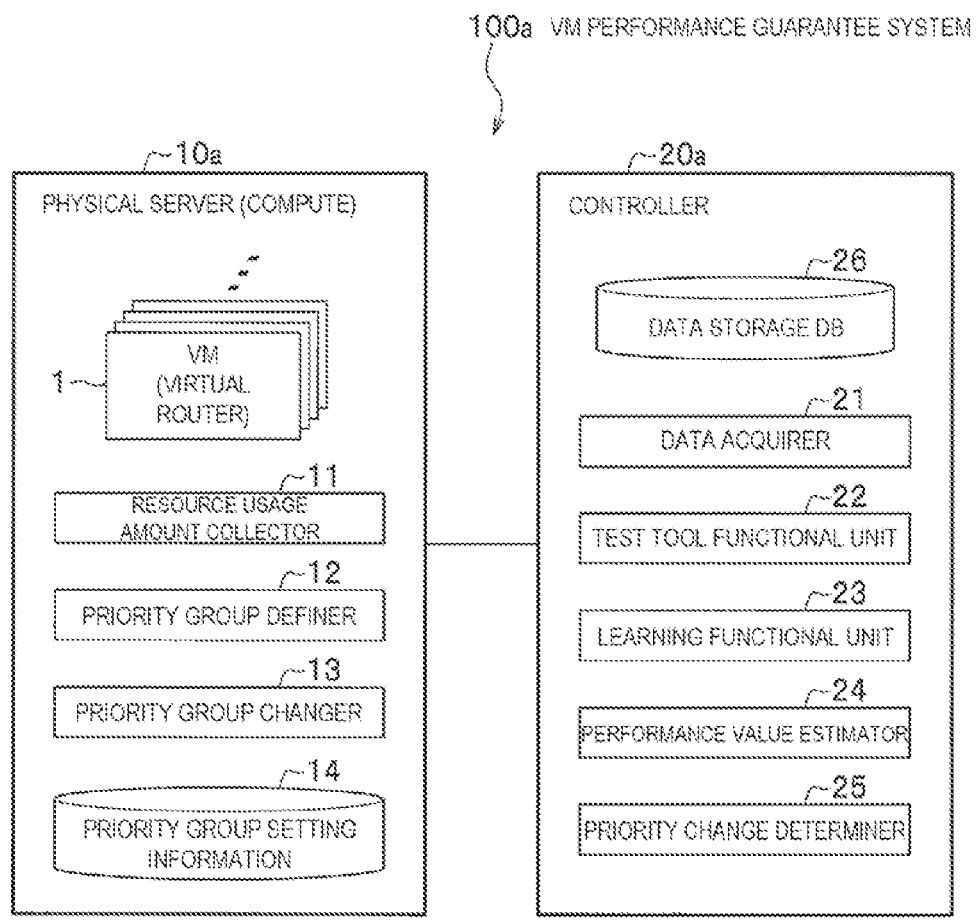
FIG. 18 is a functional block diagram of a physical server and a controller that constitute a VM performance guarantee system.

A VM performance guarantee system 100*a*, which is a comparative example of the present invention, is configured to include a physical server 10*a* (compute) including a plurality of VMs 1 and a controller 20*a* as illustrated in FIG. 18 that will be described below. The VM performance guarantee system 100*a* has the following technical features in order to guarantee the performance of VMs 1 while improving the use efficiency of the physical server 10*a*.

Figure 13:
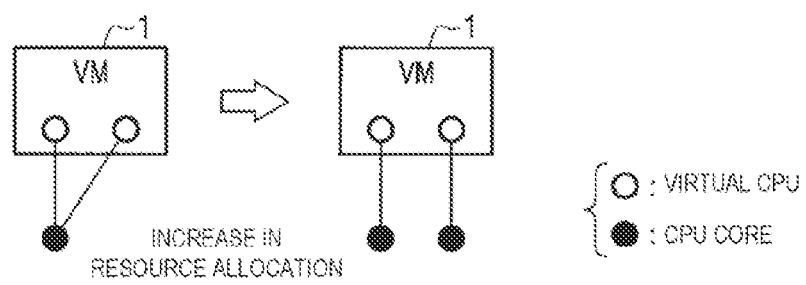
FIG. 13 is a diagram for explaining a method of the related art for increasing the allocation of resources when the load of a VM has increased.

For example, in a situation where one VM 1 (illustrated in FIG. 13 with two virtual CPUs (denoted by white circle in FIG. 13) provided for each VM 1) is running on one physical resource element (one CPU core: denoted by black circle in FIG. 13), the related art prevents performance of the VM 1 from degrading when the load of the VM 1 has increased by increasing the allocation of physical resources, that is, by adding a CPU core to change the amount of resources allocated to the VM 1 as illustrated in FIG. 13.

Specifically, when the load of the VM 1 in the left part of FIG. 13 has increased, for example, control of increasing the number of CPU cores and allocating one physical resource element (one CPU core) to each virtual CPU is performed as illustrated in the right part of FIG. 13.

Figure 14:
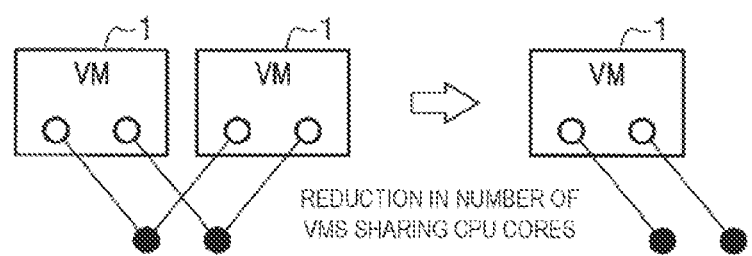
FIG. 14 is a diagram for explaining processing of changing the number of VMs sharing resources when the load of a VM has increased.

On the other hand, in a situation where two VMs 1 share two physical resource elements (CPU cores) as illustrated in FIG. 14, the VM performance guarantee system 100*a* prevents performance of a VM 1 from degrading when the load of the VM 1 has increased by changing the number of VMs 1 allocated to the physical resources. In FIG. 14, control of changing the number of VMs 1 that share the physical resources from "2" to "1" is performed (see the right part of FIG. 14).

That is, the number of VMs allocated to limited physical resources (CPU cores) is controlled rather than changing the amount of resources allocated to the VM 1.

Figure 15:
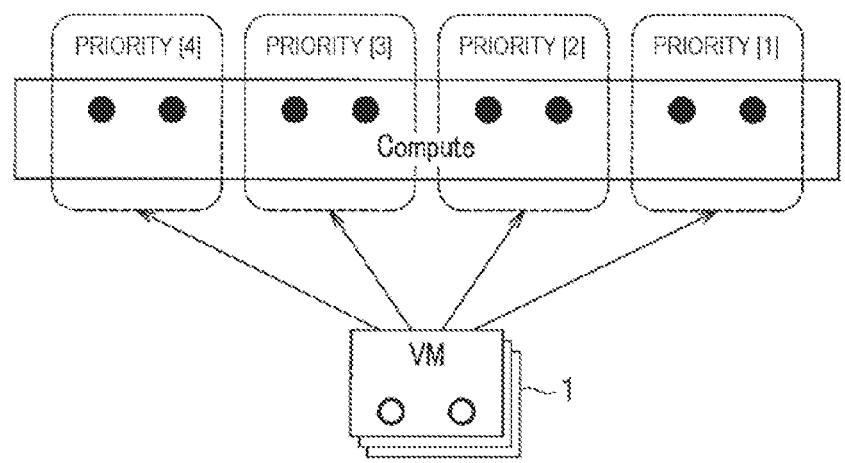
FIG. 15 is a diagram for explaining how a physical server divides resources into groups having different priorities.

In the physical server 10*a* of the VM performance guarantee system 100*a*, limited physical resources (CPU cores) are divided into groups of different priorities (see FIG. 15). Then, based on a performance estimation value (performance value) of each VM 1 calculated from the amount of resource usage of the VM 1, the group to which a VM 1 with insufficient performance belongs is changed such that the VM 1 belongs to a higher priority group. The group to which a VM 1 with excessive performance belongs is changed such that the VM 1 belongs to a lower priority group. In this manner, the VM performance guarantee system 100*a* determines which priority group each VM 1 is to belong to on the basis of a performance estimation value calculated for the VM 1 and changes the priority group to which the VM 1 belongs.

The priority groups are defined as groups (with different numbers of VMs) in which different numbers of VMs 1 share physical resources. Specifically, physical resources are divided into groups of CPU pinning patterns having different overcommit rates. Then, the priority groups (CPU pinning patterns) having different overcommit rates are dynamically changed according to the loads of VMs 1. A high load occupies (is fixed to) CPUs in a (high priority) pattern having a small overcommit rate and a low load occupies CPUs in a (low priority) pattern having a great overcommit rate. This improves the use efficiency of physical resources while guaranteeing the performance of a predetermined value or higher.

Figure 16:
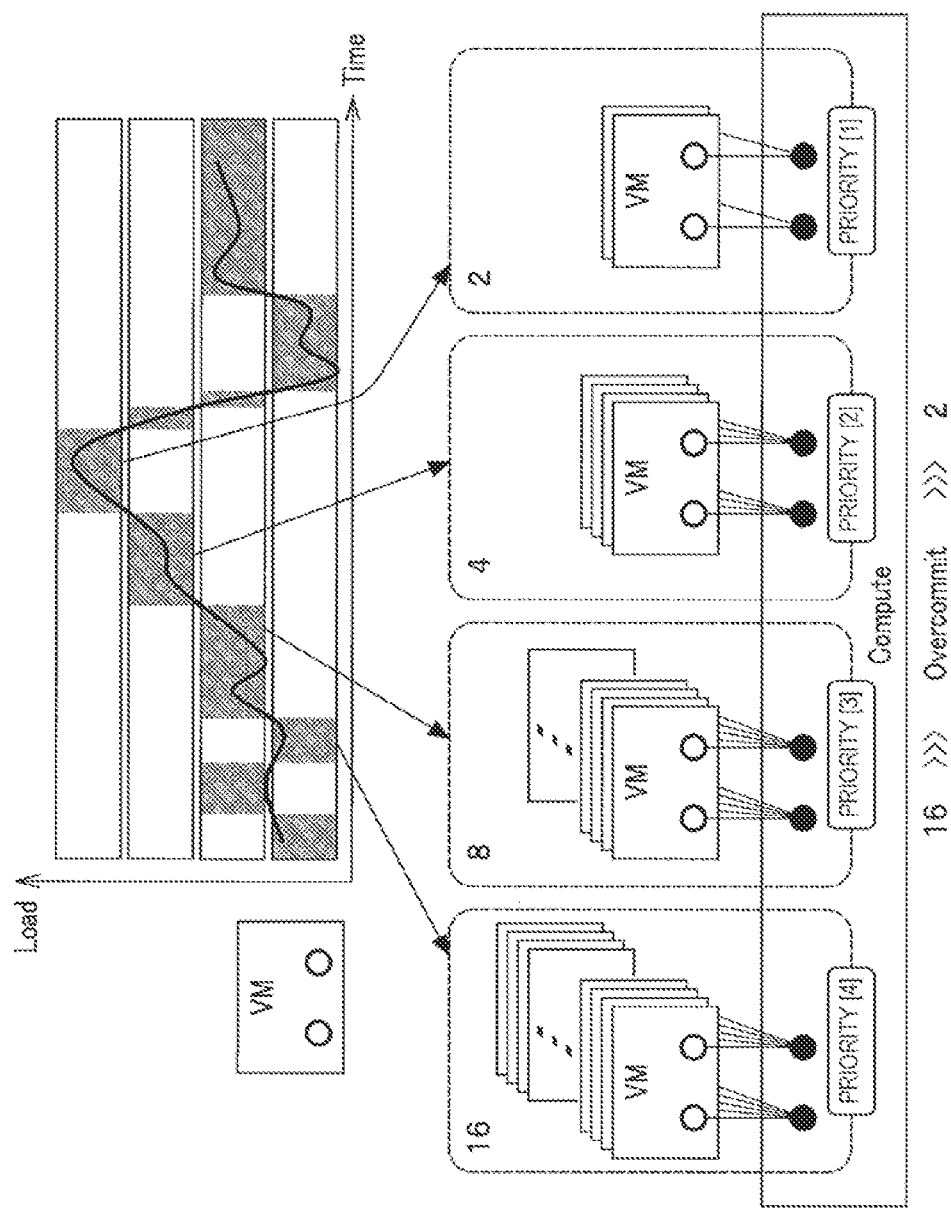
FIG. 16 is a diagram for explaining processing of changing priority groups.

For example, a "group of priority [1]" is set as a highest priority group as illustrated in FIG. 16. This "group of priority [1]" has a pattern with a small overcommit rate (high priority) which has a setting that 2 VMs are allowed to share one division (here, two CPU cores) of the limited physical resources, that is, up to 2 VMs 1 can share the division of limited physical resources. The next "group of priority [2]" is a group in which up to "4" VMs can share another division (two CPU cores) of the limited physical resources. The next "group of priority [3]" is a group in which up to "8" VMs can share another division (two CPU cores) of the limited physical resources. The "group of priority [4]" has a pattern with a great overcommit rate (low priority) which has a setting that up to "16" VMs can share another division (two CPU cores) of the limited physical resources.

Figure 17:
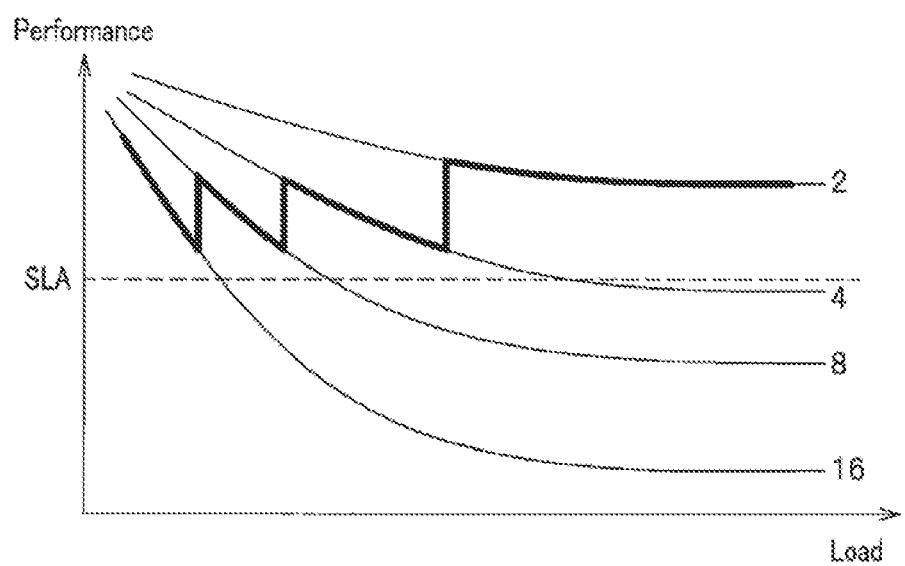
FIG. 17 is a diagram for explaining how performance of a VM is guaranteed by changing its priority group.

In the VM performance guarantee system 100*a*, for example, as illustrated in FIG. 17, when the performance of a VM 1 that initially belongs to the "group of priority [4]" with the number of VMs of "16" has degraded and approached a performance value indicated by a Service Level Agreement (SLA), which has been made in advance with a user, by a predetermined value or higher (when the performance has become insufficient), the group to which the VM 1 belongs is changed to a "group of priority [3]" with a higher priority and a smaller overcommit rate (in which the number of VMs that can share the group is "8"). Thereafter, when the performance of the VM 1 has further degraded and approached the performance value indicated by the SLA by a predetermined value or higher, similarly, the group to which the VM 1 belongs is changed to a group with a higher priority and a smaller overcommit rate such as "a group of priority [2]" (in which the number of VMs that can share the group is "4") or "a group of priority [1]" (in which the number of VMs that can share the group is "2"). This can guarantee the performance of the VM 1.

Also, in the VM performance guarantee system 100*a*, when the performance is more than sufficient (when the performance is excessive), the group to which the VM 1 belongs is changed to a group with a lower priority and a greater overcommit rate. This can improve the use efficiency of the physical resources (CPU cores).

Configuration of VM Performance Guarantee System as Comparative Example Next, the configuration of the VM performance guarantee system 100*a*, which is a comparative example of the present invention, will be described.

FIG. 18 is a functional block diagram of the physical server 10*a* and the controller 20*a* that constitute the VM performance guarantee system 100*a*. The physical server 10*a* and the controller 20*a* are connected via a communication network. In the following description, it is assumed that a plurality of VMs 1 functioning as virtual routers are arranged on one physical server 10*a*.

Physical Server 10*a*

The physical server 10*a* has a function of setting a plurality of VMs 1 (virtual machines) on the physical server (a compute function). Each VM 1 is required to satisfy performances defined by SLA or the like (for example, a packet transfer delay (latency) and a throughput).

The physical server 10*a* divides physical resources (for example, CPU cores) included in the physical server 10 into a plurality of groups having different priorities and defines groups (with different numbers of VMs) in which different numbers of VMs 1 share the respective divisions of the physical resources. Then, the physical server 10*a* changes the priority group of a VM 1 to another priority group having a different overcommit rate according to the load of the VM 1.

The physical server 10*a* has a function of generating VMs 1 (not illustrated) and also includes a resource usage amount collector 11, a priority group definer 12, a priority group changer 13, and priority group setting information 14.

The resource usage amount collector 11 collects the amount of resource usage of each VM 1 (such as the amount of CPU usage, the amount of memory usage, and the number of transmitted/received packets). Then, the resource usage amount collector 11 transmits the collected information on the amount of resource usage of each VM 1 to the controller 20a.

When a test tool which will be described below has been executed in accordance with an instruction from the controller 20a, the resource usage amount collector 11 transmits the amount of resource usage of each VM 1, which is a test result of the test tool, to the controller 20a.

The priority group definer 12 divides CPU cores, which are physical resources of the physical server 10a, into a plurality of groups. The priority group definer 12 sets the groups by dividing the CPU cores into CPU pinning patterns having different overcommit rates.

Specifically, the priority group definer 12 sets, for example, a "group of priority [1]" shared by "2" VMs as a group having the highest priority as illustrated in FIG. 16. The priority group definer 12 sets a "group of priority [2]" shared by "4" VMs as a group having the next highest priority. The priority group definer 12 further sets a "group of priority [3]" shared by "8" VMs as a group having the next highest priority. The priority group definer 12 further sets a "group of priority [4]" shared by "16" VMs as a group having the next highest priority (a group having the lowest priority).

Here, the technique of fixing (pinning) the VM 1 to dedicated CPU cores is provided, for example, by the technology of Non Patent Literature 1.

The priority group definer 12 stores information on physical resources (CPU cores) corresponding to each priority group, the number of VMs sharing the physical resources (CPU cores) of each priority group (the overcommit rate), and information indicating which priority group (which of the groups of priorities [1] to [4]) each VM 1 belongs to as priority group setting information 14.

The priority group changer 13 receives priority group change information indicating an instruction to change the priority group of a VM 1 from the controller 20a, refers to the priority group setting information 14 to identify the priority group to which the VM 1 belongs, and changes the priority group to a priority group of a CPU pinning pattern having a smaller (or greater) overcommit rate.

Controller 20a

The controller 20a acquires information on the amount of resource usage of each VM 1 from the physical server 10a and calculates a performance estimation value (performance value) of the VM 1 (virtual router). Then, the controller 20a determines which of an insufficient performance range, an unnecessary change range, and an excessive performance range the calculated performance estimation value of the VM 1 belongs to. When it is determined that the performance estimation value of the VM 1 belongs to the insufficient performance range, the controller 20a transmits an instruction (priority group change information) to change to a priority group of a CPU pinning pattern having a smaller overcommit rate to the physical server 10a. Further, when it is determined that the performance estimation value of the VM 1 belongs to the excessive performance range, the controller 20a transmits an instruction (priority group change information) to change to a priority group of a CPU pinning pattern having a greater overcommit rate to the physical server 10a.

The controller 20a includes a data acquirer 21, a test tool functional unit 22, a learning functional unit 23, a performance value estimator 24, a priority change determiner 25, and a data storage DB 26.

The data acquirer 21 acquires the amount of resource usage of each VM 1 collected by the physical server 10a and stores it in the data storage DB 26. Further, the data acquirer 21 acquires test result information such as the amount of resource usage collected as a result of the test tool executed by the physical server 10a and stores it in the data storage DB 26.

The test tool functional unit 22 activates the test tool and transmits a data acquisition start instruction to the physical server 10a to acquire data of the amount of resource usage of each VM 1 and data of a performance value (for example, a delay) corresponding thereto from the physical server 10a. For example, for each VM 1 belonging to the priority groups set with different overcommit rates, the test tool functional unit 22 causes the load of the VM 1 to change in a predetermined pattern and acquires the amount of resource usage obtained accordingly and a performance value at that time as test result information.

The learning functional unit 23 performs analysis by machine learning (for example, regression analysis learning) using the test tool result data (test result information) acquired by the test tool functional unit 22 and generates learning result data. The learning result data is information for estimating a performance value from the amount of resource usage for each VM 1 belonging to each overcommit rate (priority group).

The performance value estimator 24 calculates a performance estimation value (performance value) of each VM 1 using learning result data held in the learning functional unit 23 on the basis of the amount of resource usage of each VM 1 (at the current time) acquired from the physical server 10a.

Using the performance estimation value of each VM 1 calculated by the performance value estimator 24, the priority change determiner 25 determines which of the insufficient performance range, the unnecessary change range, and the excessive performance range the calculated performance estimation value of the VM 1 belongs to. For example, when it is determined that the performance estimation value of the VM 1 belongs to the insufficient performance range, the priority change determiner 25 transmits an instruction (priority group change information) to change to a priority group of a CPU pinning pattern having a smaller overcommit rate to the physical server 10a. When it is determined that the performance estimation value of the VM 1 belongs to the excessive performance range, the priority change determiner 25 transmits an instruction (priority group change information) to change to a priority group of a CPU pinning pattern having a greater overcommit rate to the physical server 10a. When it is determined that the performance estimation value of the VM 1 belongs to the unnecessary change range, the priority change determiner 25 does not transmit a priority group change instruction to the physical server 10a. This maintains belonging of the VM 1 to the priority group at that time.

By changing the priority group when the performance of the VM 1 is insufficient or excessive as described above, the VM performance guarantee system 100a of the comparative example can guarantee the performance of the VM 1 while physical resources are efficiently used.

Present Embodiment

Next, a VM priority control system 100 according to the present embodiment will be described.

In the VM performance guarantee system 100a (see FIG. 18) of the comparative example described above, when the performance of a VM 1 is insufficient or excessive and the physical server 10a has received priority group change information from the controller 20a, the priority group changer 13 in the physical server 10a cannot change the priority group of the VM 1 if there is no vacancy in a priority group to which the priority group of the VM 1 is to be changed. In this case, the physical server 10a transmits alarm information to the controller 20a, a management device (not illustrated) of the VM performance guarantee system 100a, and the like.

On the other hand, the VM priority control system 100 according to the present embodiment determines a (candidate) priority group to which a VM 1 is desired to belong upon determining that there is a need to change the priority group to which the VM belongs on the basis of a performance value calculated based on the amount of resource usage of the VM. The VM priority control system 100 also features that the VM priority control system 100 sets a number of dummy VMs corresponding to the number of vacancies belonging to each priority group and performs adjustment of groups including those to which other VMs 1 are desired to belong to perform control such that the priority group of the VM 1 can be more reliably changed to a priority group to which the VM 1 is desired to belong even when there is no vacancy in the priority group to which the VM 1 is desired to belong.

Figure 1:
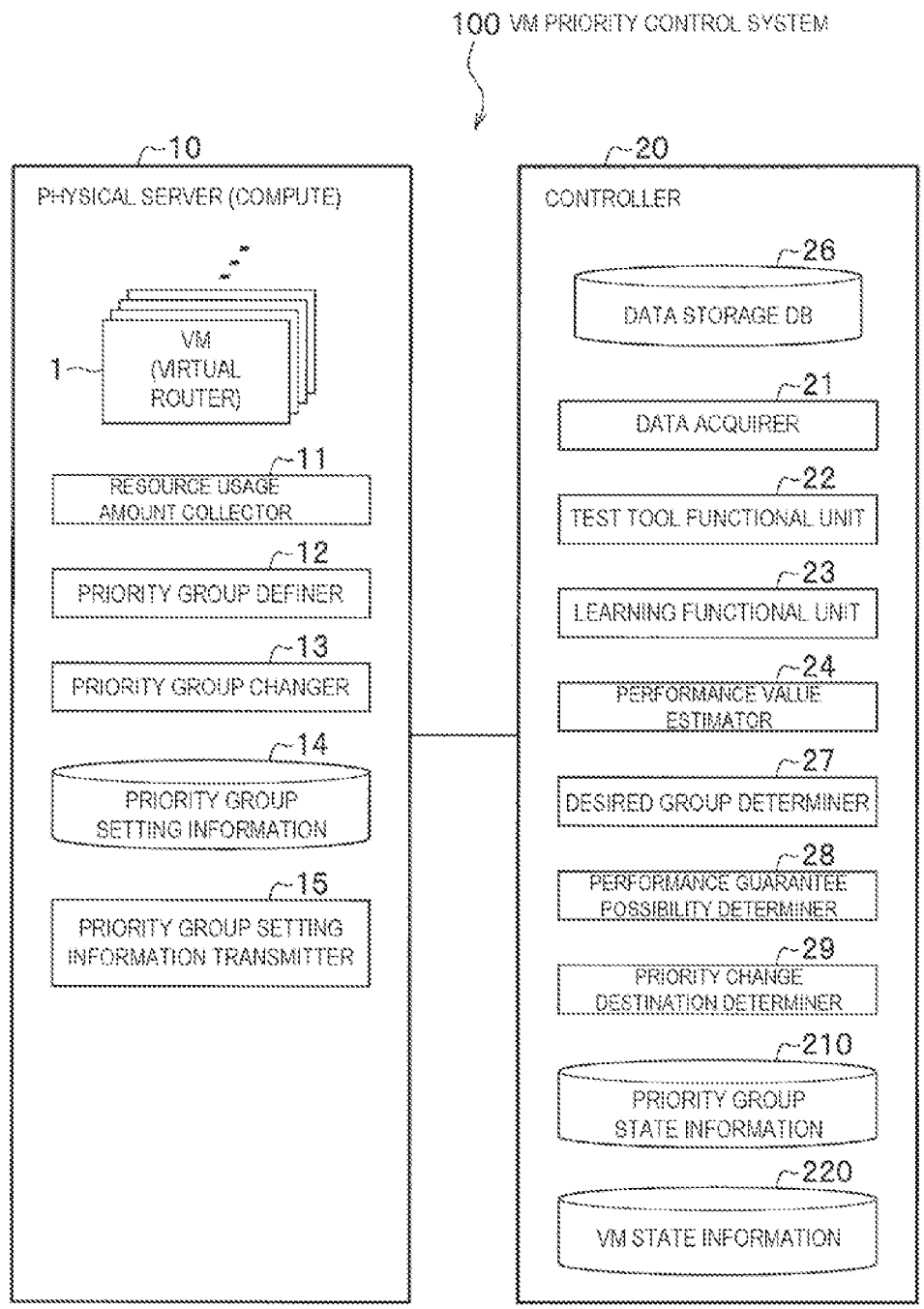
FIG. 1 is a functional block diagram of a physical server and a controller that constitute a VM priority control system according to the present embodiment.

FIG. 1 is a functional block diagram of a physical server 10 and a controller 20 that constitute the VM priority control system 100 according to the present embodiment. The physical server 10 and the controller 20 are connected via a communication network. The present embodiment will be described assuming that a plurality of VMs 1 functioning as virtual routers are arranged on one physical server 10. The number of physical servers 10 is not limited to one and a plurality of physical servers 10 may be connected to the controller 20.

Physical Server 10

The physical server 10 has a function of setting a plurality of VMs 1 (virtual machines) on the physical server (a compute function). Performances defined by SLA or the like for each VM 1 include, for example, a packet transfer delay (latency) of the VM 1 (virtual router) and a throughput. The amount of CPU usage of the VM 1 (virtual router), the amount of memory usage, the number of transmitted/received packets, and the like are used as the amount of resource usage.

The physical server 10 divides physical resources (for example, CPU cores) included in the physical server 10 into a plurality of groups having different priorities and defines groups with divisions of the physical resources which are shared by different numbers of VMs 1 (to which different numbers of VMs 1 can belong). Then, the physical server 10 transmits the amount of resource usage of each VM and priority group setting information 14 including which group each VM 1 currently belongs to, to the controller 20 at predetermined time intervals. The physical server 10 receives priority group setting change information indicating a new priority group to which the VM 1 is to belong determined by the controller 20 and changes the priority group of the VM 1.

The physical server 10 has a function of generating VMs 1 (not illustrated) and also includes a resource usage amount collector 11, a priority group definer 12, a priority group changer 13, priority group setting information 14, and a priority group setting information transmitter 15. The physical server 10 also includes an input/output unit and a storage unit (both not illustrated).

The input/output unit includes a communication interface for transmitting or receiving information and an input/output interface for transmitting or receiving information to or from input devices such as touch panels and keyboards and output devices such as monitors.

The storage unit includes a flash memory, a hard disk, a random access memory (RAM), or the like. The priority group setting information 14 illustrated in FIG. 1 is stored in the storage unit of the physical server 10.

The physical server 10 according to the present embodiment differs from the components of the physical server 10a of the VM performance guarantee system 100a of the comparative example illustrated in FIG. 18 in that the physical server 10 according to the present embodiment includes a priority group setting information transmitter 15. Components having the same functions as those of the physical server 10a of the comparative example are given the same terms and reference signs and detailed descriptions thereof will be omitted.

The priority group setting information transmitter 15 transmits the priority group setting information 14 in the storage unit to the controller 20 at predetermined time intervals.

Specifically, the priority group setting information transmitter 15 transmits the number of VMs that share physical resources (CPU cores) of each priority group (the possible number of VMs belonging to each priority group: overcommit rate) and information indicating which priority group (which of the groups of priorities [1] to [3]) each VM 1 belongs to, both of which are indicated by the priority group setting information 14, to the controller 20.

In the following description, it is assumed that the priority group definer 12 of the physical server 10 according to the present embodiment sets three groups (of priorities (priority ranks) [1] to [3]) as priority groups accommodating VMs 1. The groups are given priority ranks in ascending order from the group having the highest priority. Among these, the group having the highest priority (priority rank) is the priority group [1] and the number of VMs that can share the group (the possible number of VMs belonging to the group) is "2". The group having the next highest priority (priority rank) is the priority group "2" and the number of VMs that can share the group (the possible number of VMs belonging to the group) is "4". The group having the next highest priority (priority rank) (lowest priority) is the priority group "3" and the number of VMs that can share the group (the possible number of VMs belonging to the group) is "8".

Controller 20

The controller 20 acquires the amount of resource usage and the priority group setting information 14 from the physical server 10. Then, the controller 20 determines a priority group to which each VM 1 is desired to belong. The controller 20 determines whether performance guarantee is possible on the basis of the determined priority group to which the VM 1 is desired to belong and, when it is determined that performance can be guaranteed, sets a number of dummy VMs corresponding to vacancies belonging to each priority group and performs predetermined adjustment of groups including those to which other VMs 1 are desired to belong to perform control such that the priority group of the VM 1 can be more reliably changed to a priority group to which the VM 1 is desired to belong.

The controller 20 includes a data acquirer 21, a test tool functional unit 22, a learning functional unit 23, a performance value estimator 24, a data storage DB 26, a desired group determiner 27, a performance guarantee possibility determiner 28, a priority change destination determiner 29, priority group state information 210, and VM state information 220. The controller 20 also includes an input/output unit and a storage unit (both not illustrated).

The input/output unit includes a communication interface for transmitting or receiving information and an input/output interface for transmitting or receiving information to or from input devices such as touch panels and keyboards and output devices such as monitors.

The storage unit includes a flash memory, a hard disk, a RAM, or the like. The storage unit of the controller 20 includes a data storage DB 26, priority group state information 210, and VM state information 220 as illustrated in FIG. 1. The data storage DB 26 stores information on the amount of resource usage of each VM 1 (such as the amount of CPU usage, the amount of memory usage, and the number of transmitted/received packets), the priority group setting information 14, and the like acquired from the physical server 10. The data storage DB 26 also stores information on test results for each VM 1 acquired from the physical server 10 in accordance with an instruction from the test tool functional unit 22. The priority group state information 210 and the VM state information 220 are pieces of information provided each time the controller 20 performs processing related to changing the priority group of each VM 1 (details will be described below).

As compared with the configuration of the controller 20a of the VM performance guarantee system 100a of the comparative example illustrated in FIG. 18, the controller 20 according to the present embodiment does not include the priority change determiner 25 of the controller 20a (FIG. 18). The controller 20 differs from the controller 20a in that it instead includes the desired group determiner 27, the performance guarantee possibility determiner 28, the priority change destination determiner 29, the priority group state information 210, and the VM state information 220. Components having the same functions as those of the controller 20a of the comparative example are given the same names and reference signs and detailed descriptions thereof will be omitted.

For each VM 1, the desired group determiner 27 determines a new priority group to which the VM 1 is to belong (a priority group desired to belong to) so as not to cause insufficient performance or excessive performance on the basis of the amount of resource usage and the priority group setting information 14 that the data acquirer 21 has acquired from the physical server 10. Note that, the priority group desired to belong to may also include a case where a current priority group is set as the desired destination. Hereinafter, desired group determination processing performed by the desired group determiner 27 will be described in detail.

Figure 2:
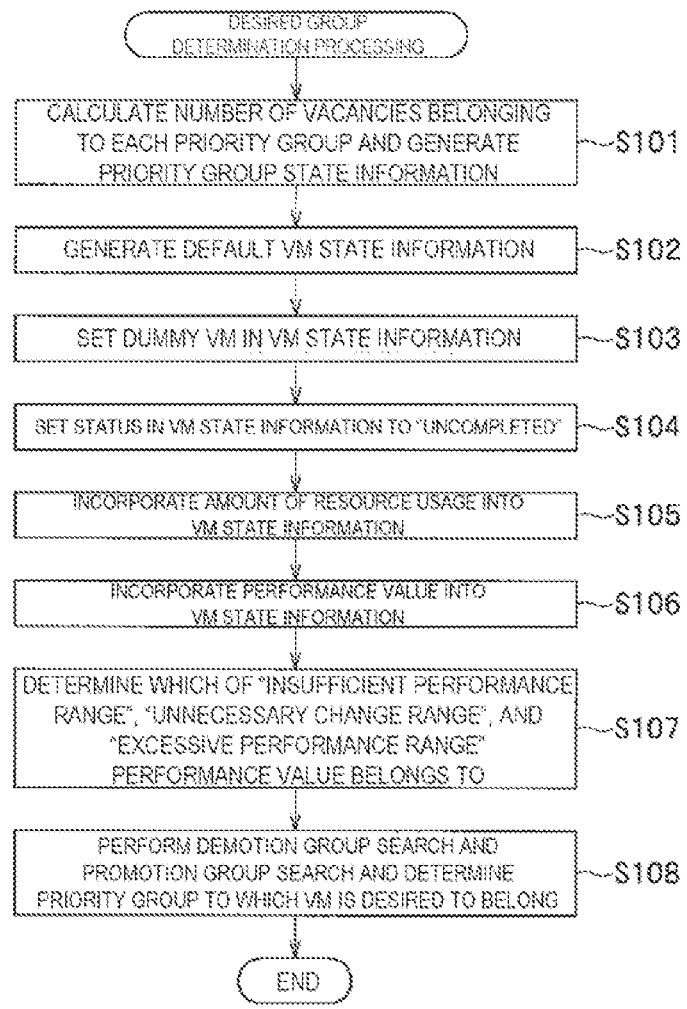
FIG. 2 is a flowchart illustrating a flow of desired group determination processing performed by a desired group determiner according to the present embodiment.

FIG. 2 is a flowchart illustrating a flow of the desired group determination processing performed by the desired group determiner 27 according to the present embodiment.

First, using priority group setting information 14 acquired by the data acquirer 21, the desired group determiner 27 calculates the number of vacancies belonging to each priority group and generates priority group state information 210 (FIG. 3) (step S101).

FIG. 3 is a diagram illustrating an exemplary data configuration of the priority group state information 210 according to the present embodiment.

The desired group determiner 27 generates the priority group state information 210 using the number of VMs that share physical resources (CPU cores) of each priority group (the possible number of VMs belonging to each priority group) and information indicating which priority group (which of the groups of priorities [1] to [3]) each VM 1 belongs to, both of which are included in the priority group setting information 14.

As illustrated in FIG. 3, the priority group state information 210 includes items of a group ID 211, a priority rank 212, the possible number of VMs belonging to group 213, and the number of vacancies belonging to group 214.

The group ID 211 is information for identifying each priority group. The priority rank 212 is a value that ranks the priorities ([1] to [3]) of priority groups from the highest priority. The possible number of VMs belonging to group 213 indicates the number of VMs set to be able to share physical resources (CPU cores) of each priority group. The number of vacancies belonging to group 214 is the number of vacancies belonging to the priority group obtained by subtracting the number of VMs 1 currently belonging to the priority group from the possible number of VMs belonging to group 213. The desired group determiner 27 can acquire information on a priority group to which a VM 1 currently belongs using the priority group setting information 14.

In FIG. 3, the number of vacancies 214 belonging to a priority group having a group ID 211 of "g0001" is "1". The number of vacancies 214 belonging to a priority group having a group ID 211 of "g0002" is "0". Further, the number of vacancies 214 belonging to a priority group having a group ID 211 of "g0003" is "2".

Next, the desired group determiner 27 generates default VM state information 220 (FIG. 4) using information indicating which priority group (which of the groups of priorities [1] to [3]) each VM 1 belongs to included in the priority group setting information 14 (step S102).

FIG. 4 is a diagram illustrating an exemplary (default) data configuration of the VM state information 220 according to the present embodiment.

As illustrated in FIG. 4, the VM state information 220 includes items of a VMID 221, a status 222, the amount of resource usage 223, a performance value 224, a current group 225, a desired group 226, and a vacancy indication 227.

The VMID 221 is information for identifying each VM 1. The status 222 stores "uncompleted" indicating that processing is underway and "completed" indicating that processing has completed. The status 222 stores " . . . " before processing starts.

The amount of resource usage 223 stores the amount of resource usage (for example, the amount of CPU usage and the amount of memory usage) of each VM 1 acquired from the physical server 10.

The performance value 224 stores the performance value that the performance value estimator 24 has calculated based on the amount of resource usage of each VM 1.

The current group 225 stores a priority group to which the VM 1 currently belongs.

The desired group 226 stores a priority group to which the VM 1 is desired to belong which the desired group determiner 27 has determined through processing which will be described below.

The vacancy indication 227 stores information that determines whether a VM 1 is an actually set VM (not a dummy) or a dummy VM. Here, the vacancy indication 227 stores "0" for a VM 1 actually set in the priority group. On the other hand, the vacancy indication 227 stores "1" for a VM set as a dummy (see FIG. 5). The vacancy indication 227 in the default VM state information 220 of FIG. 4 stores "0" for all VMs 1 because they are all actually set VMs.

For example, for a VM 1 whose VMID 221 is "v0001", the desired group determiner 27 stores "g0001" in the current group 225 and "0" in the vacancy indication 227 as illustrated in FIG. 4 using information indicating which priority group (which of the groups of priorities [1] to [3]) each VM 1 belongs to included in the priority group setting information 14. Hereinafter, the desired group determiner 27 similarly stores a current group 225 and a vacancy indication 227 ("0") for each VM 1 that is currently set.

Next, the desired group determiner 27 refers to the priority group state information 210 illustrated in FIG. 3 and additionally sets a number of dummy VMs corresponding to the sum of the numbers of vacancies belonging to group 214 (here, 1+0+2=3) in the default VM state information 220 (FIG. 4) (step S103).

Specifically, the desired group determiner 27 sets a dummy VM whose current group is "g0001" to "v0012" as illustrated in FIG. 5 because the number of vacancies in the priority group having a group ID 211 of "g0001" is "1" (see FIG. 3). Then, the desired group determiner 27 sets two dummy VMs whose current group is "g0003" to "v0013" and "v0014" as illustrated in FIG. 5 because the number of vacancies in the priority group having a group ID 211 of "g0003" is "2" (see FIG. 3).

Then, the desired group determiner 27 sets a desired group 226 of the VMs ("v0012", "v0013", and "v0014") generated as dummies to "g0003" which has the lowest priority rank among the priority groups. Further, the desired group determiner 27 sets "1" indicating dummy VMs in the vacancy indication 227.

Next, the desired group determiner 27 performs the following processing at each time when the data acquirer 21 acquires information on the amount of resource usage from the physical server 10 (see FIG. 6 as appropriate).

First, the desired group determiner 27 sets the status 222 of each VM 1 in the VM state information 220 to "uncompleted" (step S104).

Then, the desired group determiner 27 incorporates the information on the amount of resource usage acquired by the data acquirer 21 into the VM state information 220 (step S105). Further, the desired group determiner 27 incorporates and stores information on a performance value, which the performance value estimator 24 has calculated based on the amount of resource usage, in the VM state information 220 (step S106).

In the VM state information 220 illustrated in FIG. 6, "uncompleted" is stored in the status 222 of each VM 1. It is also illustrated that the amount of CPU usage (denoted as "C" in FIG. 6) and the amount of memory usage (denoted as "M" in FIG. 6) are stored as the amount of resource usage and a performance value 224 obtained from the value of the amount of resource usage is stored. The amount of resource usage and the performance value are illustrated as normalized values with the maximum value being 100 for ease of description.

Here, the desired group determiner 27 determines which of the "insufficient performance range", the "unnecessary change range", and the "excessive performance range" the performance value calculated based on the amount of resource usage belongs to according to predetermined performance value determination criteria (step S107). Respective conditions (criteria) for determining whether the performance value belongs to the "insufficient performance range", the "unnecessary change range", and the "excessive performance range" are preset.

For example, insufficient performance is set as performance of less than a first predetermined threshold and excessive performance is set as performance of a second predetermined threshold or higher. Here, it is assumed that performance values in the insufficient performance range are "0 or more and less than 60", performance values in the "unnecessary change range" are "60 or more and less than 90", and performance values in the excessive performance range are "90 or more and 100 or less".

In the example illustrated in FIG. 6, a VM 1 having a VMID 221 of "v0001" is determined to belong to the excessive performance range because its performance value 224 is "100". A VM 1 having a VMID 221 of "v0002" is determined to belong to the insufficient performance range because its performance value 224 is "50". A VM 1 having a VMID 221 of "v0003" is determined to belong to the unnecessary change range because its performance value 224 is "80". A VM 1 having a VMID 221 of "v0004" is determined to belong to the insufficient performance range because its performance value 224 is "20".

Here, for the VM 1 having the VMID 221 of "0003" determined to belong to the unnecessary change range, the desired group determiner 27 sets the desired group 226 to "g0002" which is the same as the current priority group (see FIG. 6).

Subsequently, in step S108, the desired group determiner 27 performs the following processing. The desired group determiner 27 performs a "demotion group search" for the VM 1 determined to belong to the excessive performance range and determines that a priority group in which a calculated performance value is in the "unnecessary change range" is a priority group to which the VM 1 is desired to belong. The desired group determiner 27 performs a "promotion group search" for the VM 1 determined to belong to the insufficient performance range and determines that a priority group in which a calculated performance value is in the "unnecessary change range" is a priority group to which the VM 1 is desired to belong.

The demotion group search is performed by performing the following processing until a performance value calculated by the performance value estimator 24 falls in the "unnecessary change range".

The desired group determiner 27 causes the performance value estimator 24 to calculate a performance value in a priority group that is one rank lower than the group to which the VM 1 currently belongs. Then, the desired group determiner 27 determines the range of the calculated performance value and repeats the calculation of a performance value in a priority group that is one rank lower until the calculated performance value falls in the "unnecessary change range". Then, the desired group determiner 27 determines that a priority group in which the calculated performance value falls in the "unnecessary change range" is a group to which the VM 1 is desired to belong.

The promotion group search is performed by performing the following processing until a performance value calculated by the performance value estimator 24 falls in the "unnecessary change range".

The desired group determiner 27 causes the performance value estimator 24 to calculate a performance value in a priority group that is one rank higher than the group to which the VM 1 currently belongs. Then, the desired group determiner 27 determines the range of the calculated performance value and repeats the calculation of a performance value in a priority group that is one rank higher until the calculated performance value falls in the "unnecessary change range". Then, the desired group determiner 27 determines that a priority group in which the calculated performance value falls in the "unnecessary change range" is a group to which the VM 1 is desired to belong.

FIG. 7 is a diagram illustrating results of the demotion group search and the promotion group search performed by the desired group determiner 27.

A demotion group search is performed for the VM 1 whose VMID 221 is "v0001" and it is calculated that the "unnecessary change range" is reached in the priority group of "g0002". A promotion group search is performed for the VM 1 whose VMID 221 is "v0002" and it is calculated that the "unnecessary change range" is reached in the priority group of "g0001". A promotion group search is performed for the VM 1 whose VMID 221 is "v0004" and it is calculated that the "unnecessary change range" is reached in the priority group of "g0001".

The desired group determiner 27 may determine a priority group in which the range becomes the unnecessary change range by performing the calculation considering cases where each VM 1 is present in all priority groups, including states indicated by alternate long and short dash lines in FIG. 7.

The desired group determiner 27 stores priority groups to which the VMs 1 are desired to belong, determined by performing the above demotion group search or promotion group search, in the desired group 226 of the VM state information 220 as illustrated in FIG. 8.

Here, the priority change destination determiner 29 which will be described below changes the status of each VM 1, of which the desired group 226 has not changed from a priority group to which it currently belongs, from "uncompleted" to "completed".

Returning to FIG. 1, the performance guarantee possibility determiner 28 determines whether performance defined by the SLA or the like can be guaranteed on the basis of predetermined logic (performance guarantee possibility determination logic) using information on the current priority group of the VM 1 (to which the VM 1 currently belongs) and the priority group to which the VM 1 is desired to belong determined by the desired group determiner 27.

The performance guarantee possibility determiner 28 adopts the following logic as logic for determining whether performance can be guaranteed.

"Σ(Priority rank of desired priority group−Priority rank of current priority group)≤0"      (condition 1), and "Number of VMs that are desired to belong to priority group with priority rank a≤Total possible number of VMs belonging to priority groups with priority rank a or higher"      (condition 2)

Here, "a" indicates each priority group with priority rank "a" (here, "1" to "3").

In the example illustrated in FIG. 8, the conditions 1 and 2 are determined as follows. The following calculation is performed assuming that the current group 225 and the desired group 226 of each of the VMs 1 whose VMIDs 221 are "v0005" to "v0011" not illustrated in FIG. 8 are the same priority group and the status thereof is "completed". Specifically, it is assumed that there are two VMs 1 whose current group ID is "g0002" and five VMs 1 whose current group ID is "g0003".

The condition 1 is calculated as follows for VMs 1 whose VMIDs 221 are "v0001", "v0002", and "v0004". When the desired group and the current group have the same priority rank, the difference is "0" and thus the calculation is not performed and description is omitted.

Σ(Priority rank of desired priority group−Priority rank of current priority group)=(2−1)+(1−2)+ (1−3)=−2≤0

Thus, the condition 1 is satisfied.

Regarding the condition 2, the number of VMs desiring the priority rank "1" (priority group [1]) is "2" and the total possible number of VMs belonging to the priority rank "1" or higher is "2". Thus, 2≤2 and the condition 2 is satisfied for the priority rank "1".

The number of VMs desiring the priority rank "2" (priority group [2]) is "4" and the total possible number of VMs belonging to the priority rank "2" or higher is "4" (4+0). Thus, 4≤4 and the condition 2 is satisfied for the priority rank "2". Here, "+0" is added because there is no vacancy belonging to the priority group having the priority rank "1".

The number of VMs desiring the priority rank "3" (priority group [3]) is "5" and the total possible number of VMs belonging to the priority rank "3" or higher is "8" (8+0+0). Thus, 5≤8 and the condition 2 is satisfied for the priority rank "3". Here, "+0+0" is added because there is no vacancy belonging to the priority groups having the priority ranks "1" and "2".

Therefore, the condition 2 is satisfied for all priority ranks.

The performance guarantee possibility determiner 28 determines that performance guarantee is possible when the conditions 1 and 2 are satisfied. On the other hand, the performance guarantee possibility determiner 28 determines that performance guarantee is not possible when any of the conditions 1 and 2 is not satisfied and outputs alarm information to the management device or the like of the entire system.

Returning to FIG. 1, the priority change destination determiner 29 performs the following processing when the performance guarantee possibility determiner 28 has determined that the performance guarantee is possible.

The priority change destination determiner 29 refers to the VM state information 220 illustrated in FIG. 8 and first determines whether the current group 225 and the desired group 226 are equal or different for each VM 1 whose vacancy indication 227 is "0". Then, the priority change destination determiner 29 changes the status 222 from "uncompleted" to "completed" when the current group 225 and the desired group 226 are equal. This processing may be performed when the desired group 226 of each VM 1 has been calculated.

Further, the priority change destination determiner 29 performs the following processing 1 and processing 2 when the current group 225 and the desired group 226 of a VM 1 are different.

(Processing 1) When other VMs 1 (including dummy VMs) include a VM 1 whose current group 225 and desired group 226 are paired with those of the VM 1 (a VM 1 which is in a belonging relationship with the VM 1 such that the paired priority groups of the two VMs 1 are opposite to each other and become identical when swapped), the priority change destination determiner 29 exchanges the group of the VM 1 with that of the paired VM 1 and changes their status from "uncompleted" to "completed".

(Processing 2) When other VMs 1 (including dummy VMs) include no VM 1 whose current group 225 and desired group 226 are paired with those of the VM 1 (include no VM 1 which is in a belonging relationship with the VM 1 such that the paired priority groups of the two VMs 1 are opposite to each other and become identical when swapped), the priority change destination determiner 29 exchanges the current group of the VM 1, which has no other VM 1 paired with it, with that of a dummy VM with a vacancy indication of "1" whose current group is equal to or higher than the desired group of the VM 1 and changes their status from "uncompleted" to "completed".

In the processing 1, the priority change destination determiner 29 exchanges the priority group of the current group 225 of a VMID 221 of "v0001" with that of a VMID 221 of "v0002" because the current groups 225 and the desired groups 226 of the VMIDs 221 of "v0001" and "v0002" are paired (in a belonging relationship such that the paired priority groups of the two VMIDs are opposite to each other and become identical when swapped) as illustrated in FIG. 9(a). The priority change destination determiner 29 also exchanges the priority group of the current group 225 of a VMID 221 of "v0004" with that of a VMID 221 of "v0012" because the current groups 225 and the desired groups 226 of the VMIDs 221 of "v0004" and "v0012" are paired (in a belonging relationship such that the paired priority groups of the two VMIDs are opposite to each other and become identical when swapped). As a result, the changed current groups 225 become as illustrated in FIG. 9(b).

After exchanging the priority groups, the priority change destination determiner 29 converts the status 222 from "uncompleted" to "completed" as illustrated in FIG. 10 and ends the processing.

Figure 11:
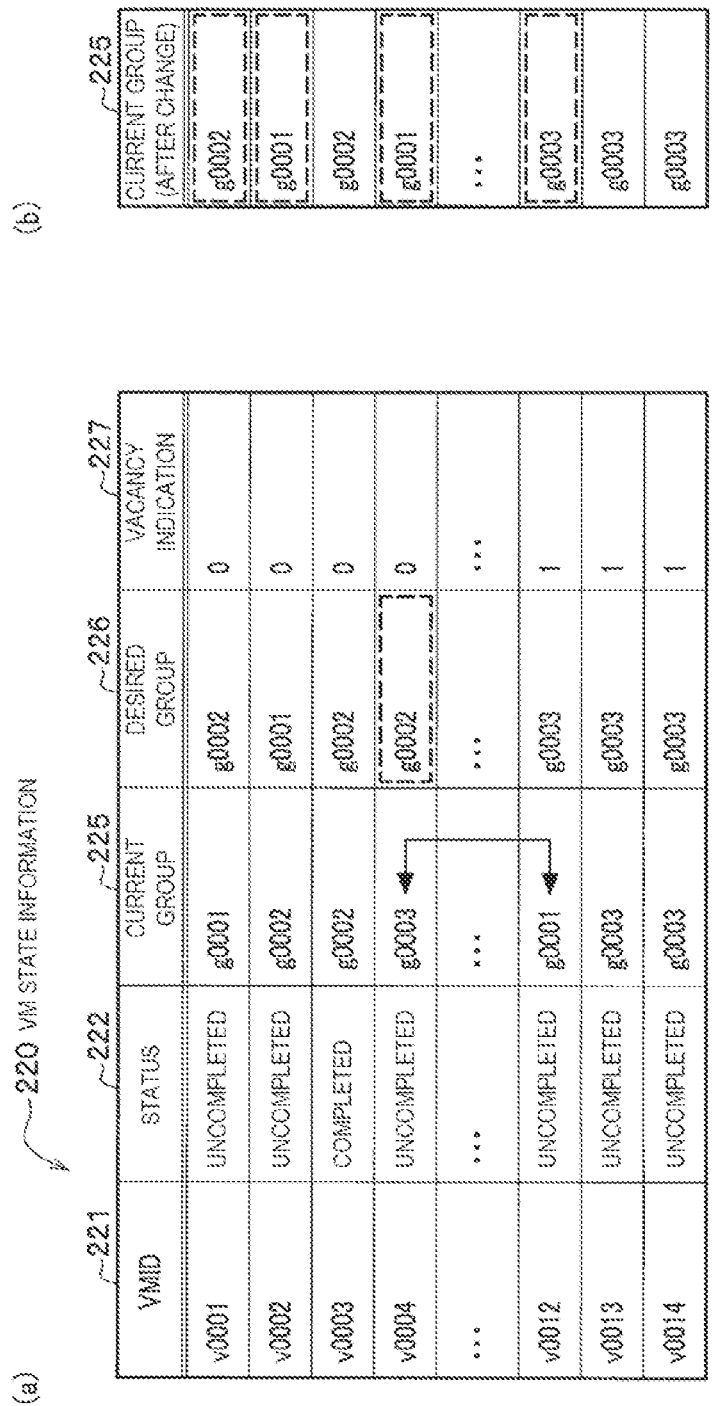
FIG. 11 is a diagram illustrating an exemplary data configuration of VM state information (with change destination determination (processing 2)) according to the present embodiment.

The processing 2 will be described with regard to an example in which the current group 225 and the desired group 226 of a VM 1 whose VMID 221 is "v0004" are "g0003" and "g0002", respectively, as illustrated in FIG. 11(a). Here, there is no VM 1 paired with the VM 1 of "v0004" among other VMs (including dummy VMs). In this case, the priority change destination determiner 29 exchanges the priority group of the VM 1 of "v0004" with that of a dummy VM of "v012" with a vacancy indication of "1" (whose current group is "g0001") whose current group is equal to or higher than the desired group 226 of "g0002" of the VM 1 of "v0004" (see a double-headed arrow in FIG. 11(a)). As a result, the changed current groups 225 become as illustrated in FIG. 11(b). After exchanging the priority groups, the priority change destination determiner 29 converts the status 222 from "uncompleted" to "completed" and ends the processing. By doing so, performance can be guaranteed even when there is no other whose current group 225 and desired group 226 are paired with those of the VM.

The priority change destination determiner 29 may be set to perform only the processing 1 or may be set to perform both the processing 1 and 2.

When every status 222 of the VM state information 220 is "completed" as illustrated in FIG. 10, the priority change destination determiner 29 transmits information on the current groups 225 of VMs 1 whose vacancy indication 227 is "0" to the physical server 10 as priority group setting change information.

Processing Flow

Next, a flow of processing performed by the VM priority control system 100 will be described with reference to FIG. 12.

Figure 12:
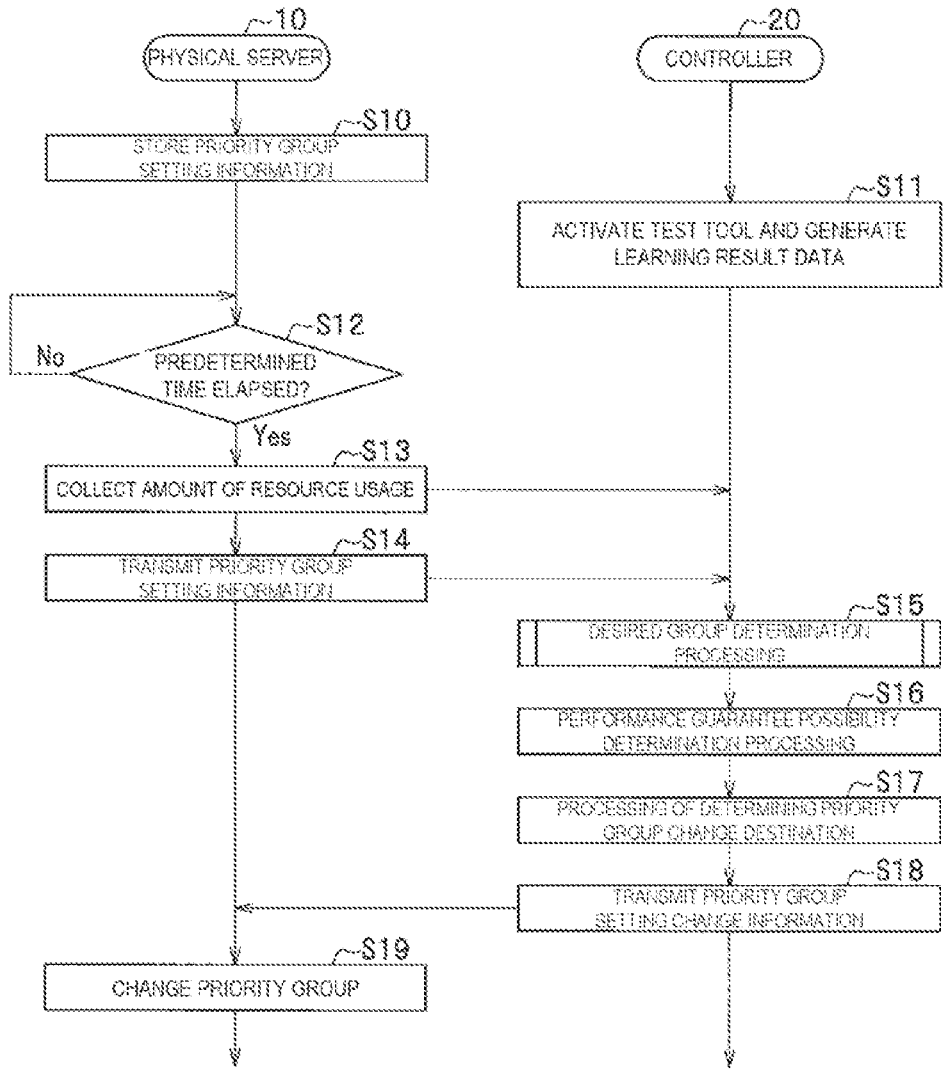
FIG. 12 is a flowchart illustrating a flow of overall processing performed by the VM priority control system according to the present embodiment.

FIG. 12 is a flowchart illustrating a flow of overall processing performed by the VM priority control system 100 according to the present embodiment.

First, the priority group definer 12 of the physical server 10 stores information on the number of VMs sharing physical resources (CPU cores) corresponding to each priority group (the possible number of VMs belonging to each priority group: overcommit rate) and information indicating which priority group (which of the groups of priorities (priority ranks) [1] to [3]) each VM 1 belongs to in the storage unit as priority group setting information 14 (step S10).

Subsequently, the test tool functional unit 22 and the learning functional unit 23 of the controller 20 activate the test tool, acquire execution results of the test tool from the physical server 10, and generate learning result data necessary to calculate a performance value of each VM 1 (step S11). Using this learning result data, the performance value estimator 24 of the controller 20 can calculate the performance value on the basis of data of the amount of resource usage of each VM 1 that is updated in real time.

Next, the resource usage amount collector 11 of the physical server 10 determines whether a predetermined time has elapsed (step S12). When the predetermined time has not elapsed (step S12→No), the processing returns to step S12 and waits until the predetermined time elapses. On the other hand, when the predetermined time has elapsed (step S12→Yes), the processing proceeds to the next step S13. That is, the subsequent processing is repeatedly performed at predetermined time intervals.

In step S13, the resource usage amount collector 11 of the physical server 10 collects information on the amount of resource usage of each VM 1 and transmits it to the controller 20.

Further, in step S14, the priority group setting information transmitter 15 of the physical server 10 transmits the priority group setting information 14 in the storage unit to the controller 20 at predetermined time intervals. Specifically, the priority group setting information transmitter 15 transmits the number of VMs that share physical resources (CPU cores) of each priority group (the possible number of VMs belonging to each priority group) and information indicating which priority group (which of the groups of priorities [1] to [3]) each VM 1 belongs to, both of which are indicated by the priority group setting information 14, to the controller 20.

Regardless of the order of the processing of steps S13 and S14, either the information of step S13 or that of step S14 may first be transmitted to the controller 20 or both may be transmitted simultaneously.

Subsequently, the desired group determiner 27 of the controller 20 performs desired group determination processing for each VM 1 to determine a new priority group to which the VM 1 is to belong (a priority group desired to belong to) so as not to cause insufficient performance or excessive performance on the basis of the amount of resource usage and the priority group setting information 14 that the data acquirer 21 has acquired from the physical server 10 (step S15). A description of this desired group determination processing is omitted here because it has already been described with reference to FIG. 2 or the like.

Through the desired group determination processing of step S15, the desired group determiner 27 can determine a priority group which is the desired group 226 for each VM 1, for example, as illustrated in FIG. 8.

Next, the performance guarantee possibility determiner 28 of the controller 20 determines whether performance defined by the SLA or the like can be guaranteed on the basis of predetermined logic (performance guarantee possibility determination logic) using information on the current priority group of the VM 1 (the a current group 225 of FIG. 8) and the priority group to which the VM 1 is desired to belong determined by the desired group determiner 27 (the desired group 226 in FIG. 8) (step S16).

When the above conditions 1 and 2 indicated by the predetermined logic (performance guarantee possibility determination logic) are not satisfied, the performance guarantee possibility determiner 28 determines that performance cannot be guaranteed and stops processing and transmits alarm information to the management device or the like of the VM priority control system 100. On the other hand, when the conditions 1 and 2 are satisfied, the performance guarantee possibility determiner 28 determines that performance can be guaranteed and the processing proceeds to the subsequent processing.

Subsequently, the priority change destination determiner 29 of the controller 20 performs processing of determining a priority group change destination (step S17). Specifically, the priority change destination determiner 29 refers to the VM state information 220 and determines that there is no need to change the priority group when the current group 225 and the desired group 226 are the same for each VM 1 whose vacancy indication 227 is "0" and sets the status 222 to "completed".

On the other hand, the priority change destination determiner 29 refers to the VM state information 220 and performs the above processing 1 and 2 when the current group 225 and the desired group 226 are different for each VM 1 whose vacancy indication 227 is "0".

When other VMs 1 (including dummy VMs) include a VM 1 whose current group 225 and desired group 226 are paired with those of the VM 1 (a VM 1 which is in a belonging relationship with the VM 1 such that the paired priority groups of the two VMs 1 are opposite to each other and become identical when swapped), the priority change destination determiner 29 determines a priority group to which the current priority group of the VM 1 is to be changed by exchanging the current priority group of the VM 1 with that of the paired VM 1 through the processing 1.

In addition, when other VMs 1 (including dummy VMs) include no VM 1 whose current group 225 and desired group 226 are paired with those of the VM 1, the priority change destination determiner 29 determines a priority group to which the current priority group of the VM 1 having no other VM 1 paired is to be changed by exchanging the current priority group of the VM 1 with that of a dummy VM with a vacancy indication of "1" whose current group is equal to or higher than the desired group of the VM 1 through the processing 2.

The priority change destination determiner 29 generates priority group setting change information including information on the changed priority group of the current group 225 and transmits the generated priority group setting change information to the physical server 10 (step S18).

The priority group changer 13 of the physical server 10 refers to the received priority group setting change information and changes the priority group of a VM 1 for which a different priority group from the current priority group of the VM 1 is set (step S19). At this time, the priority group changer 13 updates the priority group setting information 14 on the basis of the priority group to which the VM 1 newly belongs and ends the processing.

According to the VM priority control system 100 and the VM priority control method according to the present embodiment, vacancies belonging to each priority group are handled as dummy VMs and adjustment of priority groups to which VMs belong is performed with the dummy VMs included as described above. This can improve the resource use efficiency while more reliably guaranteeing the performance of the VM even when there is no vacancy in the priority group to which the VM is desired to belong.

REFERENCE SIGNS LIST

1 VM (virtual router)
10 Physical server (compute)
11 Resource usage amount collector
12 Priority group definer
13 Priority group changer
14 Priority group setting information
15 Priority group setting information transmitter
20 Controller
21 Data acquirer
22 Test tool functional unit
23 Learning functional unit
24 Performance value estimator
26 Data storage DB
27 Desired group determiner
28 Performance guarantee possibility determiner
29 Priority change destination determiner
100 VM priority control system
210 Priority group state information
220 VM state information

The invention claimed is:

1. A VM priority control system comprising: a physical server configured to cause a plurality of Virtual Machines (VMs) to run; and a controller connected to the physical server and configured to manage running states of the plurality of VMs, wherein the physical server is configured to:
store priority group setting information including a correspondence relationship between a priority group and the plurality of VMs to be run on physical resources of the priority group, a plurality of the priority groups being a plurality of groups divided from physical resources of the physical server, each of the plurality of groups resulting from the division being configured to have an available belonging number that is different from each other, the available belonging number being a number of a plurality of VMs sharable for each of the plurality of groups, the plurality of priority groups having priorities such that a priority group of the plurality of priority groups having a smaller number of the plurality of VMs sharable has a higher priority;
collect an amount of resource usage when each of the plurality of VMs runs and transmit the amount of resource usage that is collected to the controller;
transmit the priority group setting information to the controller; and
when priority group setting change information indicating an instruction to change the priority group of each of the plurality of VMs is received from the controller, refer to the priority group setting information and change the priority group to which a VM of the plurality of VMs belongs to a new priority group,
the controller comprises one or more processors configured to:
acquire the amount of resource usage of each of the plurality of VMs and the priority group setting information from the physical server;
determine a desired priority group to which each of the plurality of VMs is desired to belong so as not to cause insufficient performance that is performance of less than a first predetermined threshold and excessive performance that is performance of a second predetermined threshold or higher by calculating a performance value of each of the plurality of VMs in a case where the VM of the plurality of VMs belongs to each priority group using the amount of resource usage of the VM of the plurality of VMs, refer to the priority group setting information to calculate a number of vacancies belonging to each priority group by subtracting the number of the plurality of VMs currently belonging to the priority group from a possible number of the plurality of VMs belonging to the priority group, generate a number of dummy VMs corresponding to the number of vacancies belonging to the priority group such that the dummy VMs belong to the priority group having the vacancies, and determine a desired priority group for the dummy VMs that are generated as a priority group with a lowest priority;

determine whether performance guarantee of each of the plurality of VMs is achievable based on predetermined performance guarantee possibility determination logic using information on a current priority group to which each of the plurality of VMs currently belongs and the desired priority group, that is determined, of each of the plurality of VMs; and when it is determined that the performance guarantee is achievable, determine a priority group as a new current priority group, the priority group being obtained by exchanging the current priority group between pairs of the current priority group and the desired priority group for each of the plurality of VMs and the dummy VMs, the pairs having a relationship in which the current priority group and the desired priority group of one of the pairs respectively match the desired priority group and the current priority group of another one of the pairs, and generate and transmit the priority group setting change information including information on the determined new current priority group to the physical server.

2. The VM priority control system according to claim 1, wherein the predetermined performance guarantee possibility determination logic satisfies the following conditions 1 and 2 where priority ranks of the priority groups are in ascending order from a highest priority:

$\Sigma$(Priority rank of desired priority group−Priority rank of current priority group)$\leq 0$    (condition 1), Number of the plurality of VMs that are desired to belong to priority group with priority rank $a \leq$ Total possible number of the plurality of VMs belonging to priority groups with priority rank $a$ or higher    (condition 2), where "a" indicates any of the priority ranks among all priority ranks.

3. The VM priority control system according to claim 1, wherein the controller is configured to, when, among pairs of the current priority group and the desired priority group, one of the pairs has no corresponding pair, the corresponding pair having, with the one of the pairs, a relationship in which the desired priority group and the current priority group of the corresponding pair respectively match the current priority group and the desired priority group of the one of the pairs, identify a dummy VM of the dummy VMs, the dummy VM belonging to a current priority group of which priority is higher than a priority of a desired priority group of a VM of the plurality of VMs, the VM corresponding to the one of the pairs, and determine a priority group as the new current priority group, the priority group being obtained by exchanging the current priority group between the dummy VM identified and the VM, the VM corresponding to the one of the pairs.

4. A VM priority control method for a VM priority control system, the VM priority control system including a physical server configured to cause a plurality of VMs to run; and a controller connected to the physical server and configured to manage running states of the plurality of VMs, wherein the physical server includes a storage medium configured to store priority group setting information including a correspondence relationship between a priority group and the plurality of VMs to be run on physical resources of the priority group, a plurality of the priority groups being a plurality of groups divided from physical resources of the physical server, each of the plurality of groups resulting from the division being configured to have an available belonging number that is different from each other, the available belonging number being a number of a plurality of VMs sharable for each of the plurality of groups, the plurality of priority groups having priorities such that a priority group of the plurality of priority groups having a smaller number of the plurality of VMs sharable has a higher priority, the VM priority control method comprising:

by the physical server, collecting an amount of resource usage when each of the plurality of VMs runs and transmitting the amount of resource usage that is collected to the controller;

by the physical server, transmitting the priority group setting information to the controller;

by the controller, acquiring the amount of resource usage of each of the plurality of VMs and the priority group setting information from the physical server;

by the controller, determining a desired priority group to which each of the plurality of VMs is desired to belong so as not to cause insufficient performance that is performance of less than a first predetermined threshold and excessive performance that is performance of a second predetermined threshold or higher by calculating a performance value of each of the plurality of VMs in a case where a VM of the plurality of VMs belongs to each priority group using the amount of resource usage of the VM of the plurality of VMs, referring to the priority group setting information to calculate a number of vacancies belonging to each priority group by subtracting the number of the plurality of VMs currently belonging to the priority group from a possible number of the plurality of VMs belonging to the priority group, generating a number of dummy VMs corresponding to the number of vacancies belonging to the priority group such that the dummy VMs belong to the priority group having the vacancies, and determining a desired priority group for the dummy VMs that are generated as a priority group with a lowest priority;

by the controller, determining whether performance guarantee of each of the plurality of VMs is achievable based on predetermined performance guarantee possibility determination logic using information on a current priority group to which each of the plurality of VMs currently belongs and the desired priority group, that is determined, of each of the plurality of VMs;

by the controller, determining, when it is determined that the performance guarantee is achievable, a priority group as a new current priority group, the priority group being obtained by exchanging the current priority group between pairs of the current priority group and the desired priority group for each of the plurality of VMs and the dummy VMs, the pairs having a relationship in which the current priority group and the desired priority group of one of the pairs respectively match the desired priority group and the current priority group of another one of the pairs, and generating and transmitting priority group setting change information including information on the determined new current priority group to the physical server; and by the physical server, referring, when the priority group setting change information is received from the controller, to the priority group setting information and changing a priority group of the VM of the plurality of VMs for which a new current priority group is indicated to a new priority group.

5. The VM priority control method according to claim 4, wherein the predetermined performance guarantee possibility determination logic satisfies the following conditions 1 and 2 where priority ranks of the priority groups are in ascending order from a highest priority:

$$\Sigma(\text{Priority rank of desired priority group} - \text{Priority rank of current priority group}) \leq 0 \quad \text{(condition 1)},$$

$$\text{Number of the plurality of VMs that are desired to belong to priority group with priority rank } a \leq \text{Total possible number of the plurality of VMs belonging to priority groups with priority rank } a \text{ or higher} \quad \text{(condition 2)},$$

where "a" indicates any of the priority ranks among all priority ranks.

6. The VM priority control method according to claim 4, further comprising:

by the controller, when, among pairs of the current priority group and the desired priority group, one of the pairs has no corresponding pair, the corresponding pair having, with the one of the pairs, a relationship in which the desired priority group and the current priority group of the corresponding pair respectively match the current priority group and the desired priority group of the one of the pairs, identifying a dummy VM of the dummy VMs, the dummy VM belonging to a current priority group of which priority is higher than a priority of a desired priority group of a VM of the plurality of VMs, the VM corresponding to the one of the pairs, and determining a priority group as the new current priority group, the priority group being obtained by exchanging the current priority group between the dummy VM identified and the VM, the VM corresponding to the one of the pairs.

* * * * *